(12) United States Patent
Varkey et al.

(10) Patent No.: US 10,304,589 B2
(45) Date of Patent: May 28, 2019

(54) DOWNHOLE CABLES AND METHODS OF MAKING THE SAME

(71) Applicant: Schlumberger Technology Corporation, Sugar Land, TX (US)

(72) Inventors: Joseph Varkey, Sugar Land, TX (US); Sheng Chang, Sugar Land, TX (US); Burcu Unal Altintas, Richmond, TX (US); Willem Wijnberg, Houston, TX (US); Qingdi Huang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/850,621

(22) Filed: Dec. 21, 2017

(65) Prior Publication Data
US 2018/0137953 A1 May 17, 2018

Related U.S. Application Data

(62) Division of application No. 14/683,002, filed on Apr. 9, 2015, now Pat. No. 9,859,037.

(60) Provisional application No. 61/977,425, filed on Apr. 9, 2014.

(51) Int. Cl.
| | |
|---|---|
| *G02B 6/44* | (2006.01) |
| *H01B 7/04* | (2006.01) |
| *H01B 3/30* | (2006.01) |
| *H02G 9/00* | (2006.01) |
| *H01B 7/20* | (2006.01) |
| *H01B 7/18* | (2006.01) |

(52) U.S. Cl.
CPC ............. *H01B 7/046* (2013.01); *G02B 6/443* (2013.01); *G02B 6/4413* (2013.01); *G02B 6/4416* (2013.01); *G02B 6/4427* (2013.01); *H01B 3/30* (2013.01); *H01B 7/188* (2013.01); *H01B 7/20* (2013.01); *H02G 9/00* (2013.01)

(58) Field of Classification Search
None
See application file for complete search history.

(56) References Cited

U.S. PATENT DOCUMENTS

| | | | | |
|---|---|---|---|---|
| 4,385,203 | A | * 5/1983 | Faranetta | ................. H01B 7/28 174/107 |
| 4,523,804 | A | * 6/1985 | Thompson | ........... G02B 6/4427 385/107 |
| 5,082,348 | A | 1/1992 | Gartside, III et al. | |
| 6,600,108 | B1 | 7/2003 | Mydur et al. | |
| 6,924,436 | B2 | 8/2005 | Varkey et al. | |
| 6,960,724 | B2 | 11/2005 | Orlet et al. | |
| 7,009,113 | B2 | 3/2006 | Varkey | |
| 7,119,283 | B1 | 10/2006 | Varkey et al. | |
| 7,170,007 | B2 | 1/2007 | Varkey et al. | |

(Continued)

*Primary Examiner* — Michelle R Connelly
(74) *Attorney, Agent, or Firm* — Eileen Pape

(57) ABSTRACT

A downhole cable that has a cable core with an inner jacket located about it. The inner jacket has a shell located thereabout, and a pair of strength member layers surrounds the inner shell. Interstitial spaces of the strength member layers are filled with bonding layers. One of the strength member layers is at a contra-helical lay angle to the other. An outer jacket is located about one of the strength member layers, and the outer jacket is bonded with the bonding layers.

4 Claims, 6 Drawing Sheets

(56) References Cited

U.S. PATENT DOCUMENTS

| | | |
|---|---|---|
| 7,294,787 B2 | 11/2007 | Varkey |
| 7,763,802 B2 | 7/2010 | Varkey et al. |
| 8,227,697 B2 | 7/2012 | Varkey et al. |
| 2014/0212609 A1 | 7/2014 | Stratton et al. |
| 2015/0294763 A1 | 10/2015 | Varkey et al. |

* cited by examiner

DOWNHOLE CABLES AND METHODS OF MAKING THE SAME

CROSS-REFERENCE TO RELATED APPLICATIONS

This Application is a Divisional of U.S. Non-Provisional application Ser. No. 14/683,002, which was filed Apr. 9, 2015, which claims benefit of and priority to U.S. Provisional Application Ser. No. 61/977,425, which was filed Apr. 9, 2014. The entirety of the foregoing is incorporated herein by reference.

FIELD OF THE DISCLOSURE

The disclosure generally relates to cables and methods of making the same.

BACKGROUND

Cable can be used to provide power to electrical submersible pumps or other downhole equipment. The cable is often deployed in the well for an extended time. The extended deployment means that the cables are exposed to the harsh downhole environment for an extended time period.

SUMMARY

An embodiment of a downhole cable includes a cable core with an inner jacket located thereabout. An inner shell is located about the inner jacket. A first bonding layer is located about the inner shell, and a first strength member layer is located about the first bonding layer. The first strength member layer is helically cabled about the first bonding layer, and the first bonding layer fills interstitial spaces in the first strength member layer. A second bonding layer is located about the first strength member layer, and the second bonding layer bonds with the first bonding layer. A second strength member layer is cabled about the second bonding layer. The second strength member layer is at a counter-helical lay angle to the first strength member, and the second bonding layer fills interstitial spaces in the second strength member layer. An outer jacket is located about the second strength member layer, and the outer jacket bonds with the second bonding layer.

Another embodiment of a downhole cable includes an inner jacket disposed about a cable core, and an inner shell is located about the inner jacket. The cable also has a pair of strength member layers surrounding the inner shell, and interstitial spaces of the strength member layers are filled with bonding layers. One of the strength member layers is at a contra-helical lay angle to the other. An outer jacket is located about one of the strength member layers, and the outer jacket is bonded with the bonding layers.

An embodiment of a metal-clad cable has a cable core. An outer jacket is located about the cable core, and a metallic tube is located about the outer jacket. The metallic tube has an interior portion that at least partially embeds into the outer jacket.

DETAILED DESCRIPTION

Figure 1:
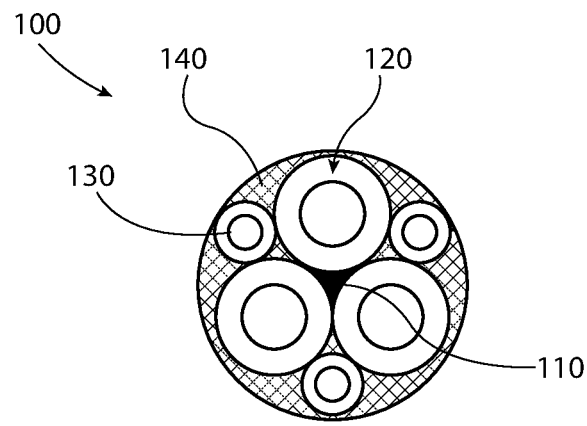
FIG. 1 depicts an embodiment of a cable core.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

An example downhole cable has a cable core. The cable core can have a center component with a plurality of conductors wrapped thereabout and at least partially embedded therein. The center component itself can also contain a plurality of conductors or optical fibers. The conductors can have insulation. The insulation can be any suitable insulating material. Illustrative insulation materials include crystallized Polyether ether ketone (PEEK), insulation grade ethylene propylene diene monomer (EPDM), polypropylene, perfluoroalkoxy alkane (PFA), fluorinated ethylene-propylene (FEP), and other suitable polymers now known or future know.

The cable core can also have a plurality of elements located in spaces formed between the plurality of conductors. The elements can be made from any material. For example, the elements can be metallic or composite. The elements can be empty tubes, tubes with optical fibers, or tubes with conductors located therein. A foam can be located about the center component, the plurality of conductors, and the elements. The foam can fill the cable core and trap air. The foam can act as a cushion and protect against damage from compressive forces that may be encountered downhole. The foam can be any foamed polymer. For example, the foam can be a closed-cell flouropolymer.

The example cable can also include an inner jacket located about the cable core. The inner jacket can be made from ethylene tetrafluoroethylene (ETFE), perfluoroalkoxy methyl vinyl ether (MFA), FEP, PFA, or other suitable polymers that are now known or future known. In an embodiment the inner jacket can be fiber reinforced polymer. The fiber reinforced polymer can have a fiber loading of from about 1 percent to about 30 percent.

An inner shell can be located about the inner jacket. The inner shell can be a polymer that bonds with the inner jacket. Example polymers include PEEK or other suitable polymers that are now known or future known. In another embodiment, the inner shell can be a metallic tube that is seam welded. An inner weld bead of the metallic tube can at least partially embed into the outer jacket. For example, the inner shell can be steel, austenitic nickel-chromium-based alloys, nickel-cobalt based alloy, or other alloys that are now know or future known. In an embodiment, the metallic tube can be made from steel in chemically resistant plating. The plating can be nickel, molybdenum, or another now know or future known suitable combination of alloy material.

The cable can also include a pair of strength member layers surrounding the inner shell. The strength member layers can include any number of strength members. The strength members can be made from any suitable material. Illustrative materials include nylon, steel, austenitic nickel-chromium-based alloys, or other now known or future known alloys. One of the strength member layers can be at a contra-helical lay angle to the other strength member layer. Interstitial spaces of the strength member layers are filled by material of bonding layers. The bonding layers can be any suitable material. Illustrative materials include ETFE, FEP, PFA, MFA, or other suitable polymers that are now known or future known. In an embodiment the bonding layers can be made from fiber reinforced polymer. The fiber reinforced polymer can have a fiber loading of from about 1 percent to about 30 percent.

The downhole cable can also include an outer jacket located about one of the strength member layers. The outer jacket can bond with the bonding layers. For example, the bonding layers can bond with one another, and the outer jacket can bond with the outer most bonding layer; thereby, bonding the outer jacket with the bonding layers.

An outer shell can be located about the outer jacket. The outer shell can be a metallic tube. The metallic tube can be steel, austenitic nickel-chromium-based alloys, nickel-cobalt based alloys, or other alloys that are now know or future known. In an embodiment, the metallic tube can be made from steel in chemically resistant plating. The plating can be nickel, molybdenum or another now know or future known suitable combination of alloy material. At least a portion of the outer shell can embed into the outer jacket. For example, the outer shell can be a seam welded metallic tube, and an inner weld bead of the metallic tube can at least partially embed into the outer jacket.

In an embodiment, an outer bonding layer can be located between the outer jacket and the outer shell, and at least a portion of the outer shell can embed into the outer bonding layer. The outer bonding layer can be any suitable material. For example, the outer bonding layer can be a foamed polymer with a low thermal expansion, such as polyurethane foam or polyphenylsulfone.

Now turning to the FIGS, FIG. 1 depicts an embodiment of a cable core. The cable core 100 can include a central component 110. The central component 110 can be made from polymer. The central component 110 can also contain conductors or fiber optic elements. The central component 110 can have any number of conductors 120 wrapped thereabout. For example, the central component 110 can have three insulated conductors 120 located thereabout, as depicted. The conductors 120 can at least partially embed into the central component 110.

The cable core 100 is depicted having elements 130 located in spaces between the conductors 120. The cable core 100 also has a foam 140 that fills spaces in the cable core 100. The foam 140 can act as a cushion to protect the cable core 100 from downhole compressive forces.

Figure 2:
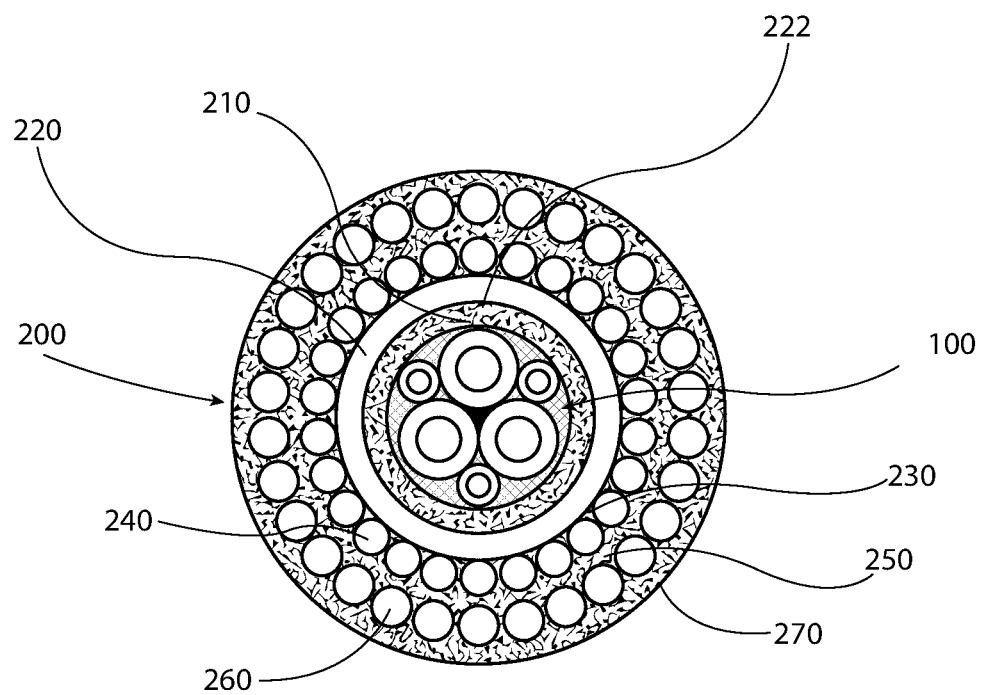
FIG. 2 depicts an embodiment of a downhole cable.

FIG. 2 depicts an embodiment of a downhole cable. The downhole cable 200 includes the cable core 100. The cable core 100 has an inner jacket 210 located thereabout. The inner jacket 210 has an inner shell 220 located thereabout. The inner shell 220 is depicted as a metallic seam welded tube. The inner shell 220 is depicted having an inner weld bead 222. The inner weld bead 222 at least partially embeds into the inner jacket 210.

The inner shell 220 has a first bonding layer 230 located thereabout. The first bonding layer 230 can be any polymer. For example, the first bonding layer 230 can be a carbon reinforced polymer.

A first strength member layer 240 is wrapped about the first bonding layer 230. For example, the strength members in the first strength member layer 240 can be helically cabled about the first bonding layer 230. The first bonding layer 230 can deform to fill interstitial spaces between the strength members in the first strength member layer 240. A second bonding layer 250 is located about the first strength member layer 240. The second bonding layer 250 bonds with the first bonding layer 230.

A second strength member layer 260 is located about the second bonding layer 250. For example, the second strength member layer 260 can be cabled about the second bonding layer 250 and have a contra-helical lay angle to the first strength member layer 240. The lay angle of the strength members of the first strength member layer 240 and the second strength member layer 260 can be from about 10 degrees to about 25 degrees. The second bonding layer 250 can deform to fill interstitial spaces between the strength members of the second strength member layer 260.

An outer jacket 270 is located about the second strength member layer 260. The outer jacket 270 bonds with the second bonding layer 250. Accordingly, the first bonding layer 230, the second bonding layer 250, and the outer jacket 270 are bonded with each other.

Figure 3:
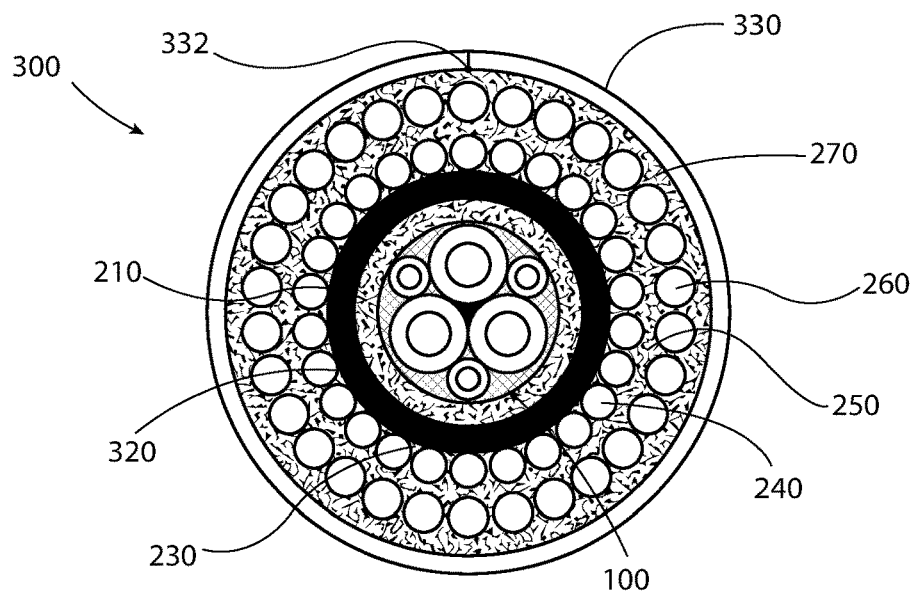
FIG. 3 depicts another embodiment of a downhole cable.

FIG. 3 depicts another embodiment of a downhole cable. The downhole cable 300 can have the cable core 100 and inner jacket 210. An inner shell 320 can be located about the inner jacket 210. The inner shell 320 is a polymeric shell. For example, the inner shell 320 can be made from PEEK.

The inner shell 320 has the first bonding layer 230, the first strength member layer 240, the second bonding layer 250, the second strength member layer 260, and the outer jacket 270 located thereabout.

The outer jacket 270 has an outer shell 330 located thereabout. The outer shell 330 at least partially embeds into the outer jacket 270. For example, the outer shell 330 can be a metallic seam welded tube, as depicted, and have an inner weld bead 332, and the inner weld bead 332 at least partially embeds into the outer jacket 270.

The cable 300 can be manufactured by placing a polymer shell, such as a jacketing or other protective layer, about a cable core. A first bonding layer can be placed about the polymer shell, and a first strength member layer is placed about the first bonding layer. The manufacturing of the cable 300 can also include placing a second bonding layer over the first strength member layer, and a second strength member layer can be placed about the second bonding layer. An outer jacket can be placed about the second strength member layer, which is bonded to the second bonding layer, and an outer shell is placed over the entire assembly.

Figure 4:
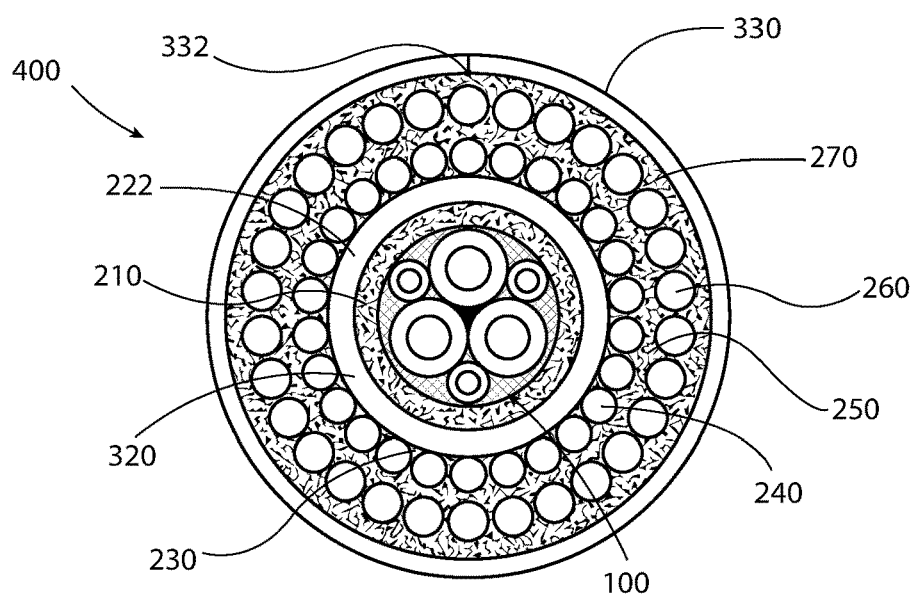
FIG. 4 depicts an additional embodiment of a downhole cable.

FIG. 4 depicts an additional embodiment of a downhole cable. The downhole cable 400 includes the cable core 100, the inner jacket 210, an inner shell 320 with an inner weld bead 222 at least partially embed into the inner jacket 210. The inner shell 320 can be similar to the inner shell 220. In an embodiment, the inner shell 320 can be made from a metal alloy or a composite.

The downhole cable 400 also includes the first bonding layer 230, the first strength member layer 240, the second bonding layer 250, the second strength member layer 260, the outer jacket 270, and the outer shell 330 with the inner weld bead 332 at least partially embedded into the outer jacket 270.

Figure 5:
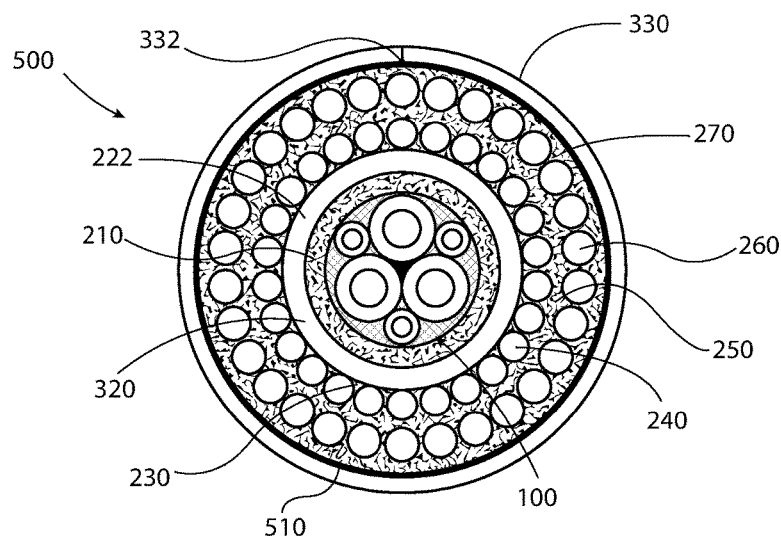
FIG. 5 depicts another embodiment of a downhole cable.

FIG. 5 depicts another embodiment of a downhole cable.

The downhole cable 500 includes the cable core 100, the inner jacket 210, the inner shell 320 with an inner weld bead 222 at least partially embed into the inner jacket 210.

The downhole cable 500 also includes the first bonding layer 230, the first strength member layer 240, the second bonding layer 250, the second strength member layer 260, the outer jacket 270, and the outer shell 330.

The downhole cable 500 has an outer bonding layer 510 located between the outer jacket 270 and the outer shell 330. The outer bonding layer 510 can be bonded with the outer jacket 270. The inner weld bead 332 of the outer shell 330 can be at least partially embedded into the outer bonding layer 510.

Figure 6:
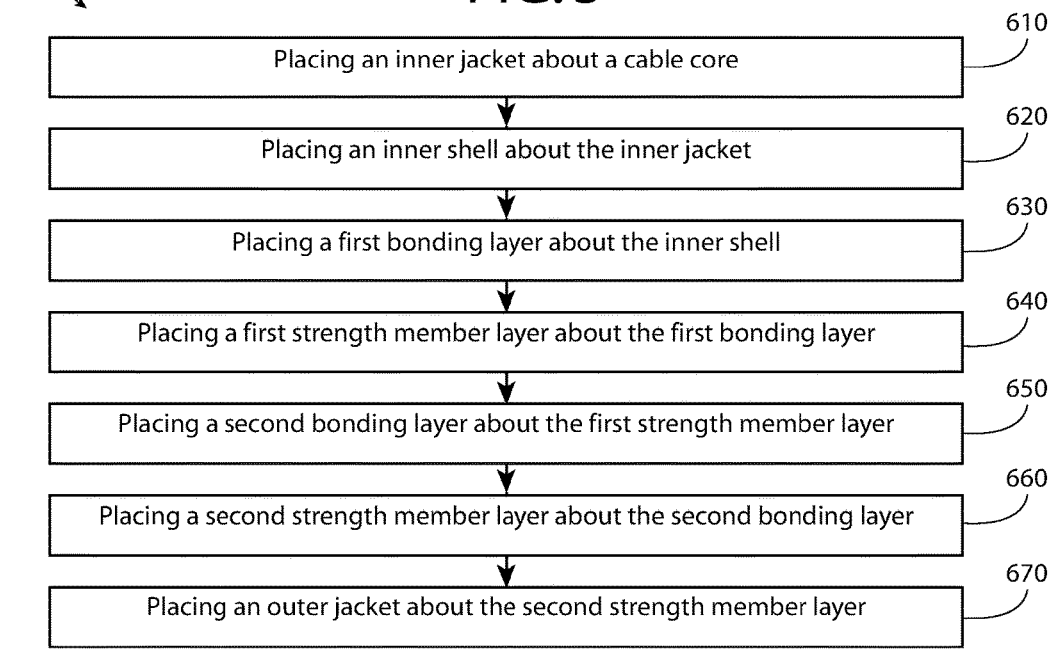
FIG. 6 depicts an embodiment of a method of making a downhole cable.

FIG. 6 depicts an embodiment of a method of making a downhole cable. The method 600 is depicted as a plurality of blocks or operations.

The method 600 includes placing an inner jacket about a cable core (Block 610). The cable core can be formed by heating a circular profile polymeric center component and cabling conductors about the center component so that the center component deforms, and the conductors at least partially embed into the center component. The cable core can be completed by placing elements in spaces between the conductors, and filling the conductor with a foam that fills the open spaces in the cable core. The inner jacket can be placed about the foam. The inner jacket can be placed about the cable core by extruding a polymer about the cable core.

The method also includes placing an inner shell about the inner jacket (Block 620). The inner shell can be placed about the inner jacket by extruding a polymer about the inner jacket. In another embodiment, a seam welded metallic tube can be drawn about the inner jacket, and the seam welded metallic tube can at least partially embed into the inner jacket.

The method 600 also includes placing a first bonding layer about the inner shell (Block 630). The first bonding layer can be placed about the inner shell by extruding a polymer over the inner shell. The polymer can be a fiber reinforced polymer.

The method further includes placing a first strength member layer about the first bonding layer (Block 640). The first strength member layer can be placed about the first bonding layer by helically cabling the strength member layer about the first bonding layer. The first strength member layer is placed about the first bonding layer before the first bonding layer fully hardens or after applying heat to the first bonding layer. Accordingly, the first bonding layer is soft and deforms to fill interstitial spaces in the first strength member layer.

The method also includes placing a second bonding layer about the first strength member layer (Block 650). The second bonding layer can be placed about the first strength member layer by extruding a polymer about the first strength member layer. The polymer can be a fiber reinforced polymer. The second bonding layer can bond with the first bonding layer.

The method also includes placing a second strength member layer about the second bonding layer (Block 660). The second strength member layer can be placed about the second bonding layer before the second bonding layer hardens or after applying heat to the second bonding layer. The second bonding layer deforms to fill interstitial spaces in the second strength member layer. The second strength member layer can be placed about the second bonding layer by cabling strength members thereof about the second boding layer so that the second strength member layer has a contra-helical lay angle to the first strength member layer.

The method also includes placing an outer jacket about the second strength member layer (Block 670). The outer jacket can be placed about the second strength member layer by extruding a polymer about the second strength member layer. The outer jacket can bond with the second bonding layer; thereby, providing a downhole cable with torque balanced strength member layers and substantially absent of air pockets.

Figure 7:
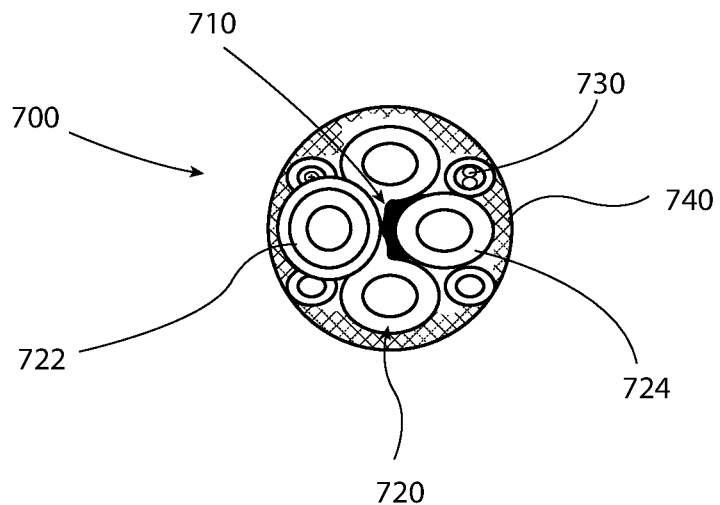
FIG. 7 depicts an embodiment of a cable core.

FIG. 7 depicts an embodiment of a cable core. The example cable core 700 includes a plurality of conductors 720 wrapped about a center component 710. The plurality of conductors is depicted including one metal encased insulated conductor 722 and three insulated conductors 724; however, the plurality of conductors 720 can include any number and any type of conductors.

The cable core 700 also has a plurality of elements 730. The elements 730 are placed in spaces between the conductors. A foam 740 fills the rest of the space in the cable core 700.

Figure 8:
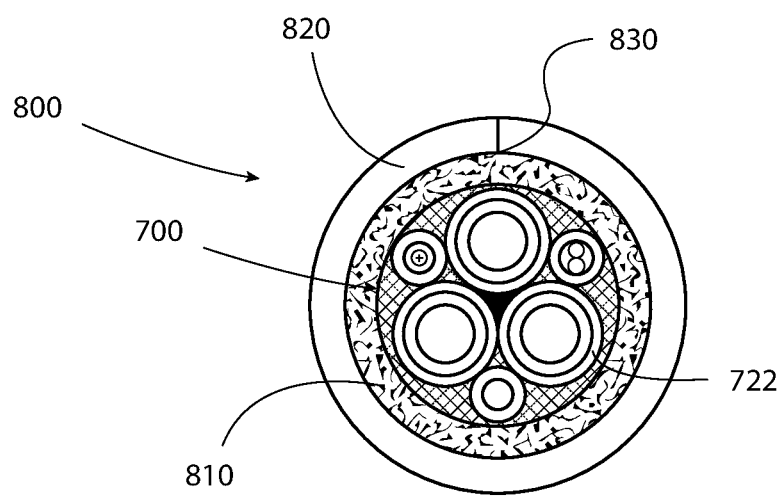
FIG. 8 depicts an embodiment of a metal-clad cable.

FIG. 8 depicts an embodiment of a metal-clad cable. The metal-clad cable 800 includes the cable core 700; however, the cable core 700 as depicted has three metal encased insulated conductors 722. The cable core 700 has an outer jacket 810 located thereabout. The outer jacket 810 has a metallic tube 820 located thereabout. The metallic tube 820 has an inner portion 830 that is at least partially embedded in the outer jacket 810.

Figure 9:
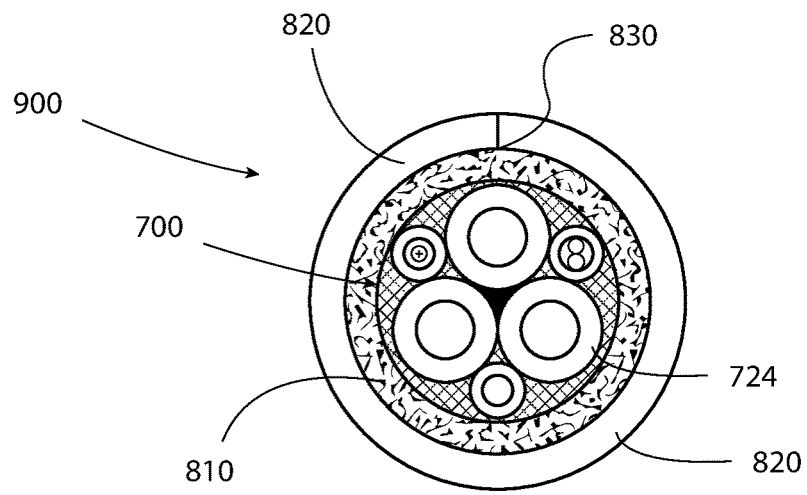
FIG. 9 depicts an embodiment of another metal-clad cable.

FIG. 9 depicts an embodiment of another metal-clad cable. The metal-clad cable 900 includes the cable core 700; however, the cable core 700 is depicted having three insulated conductors 724. The cable core 900 has the outer jacket 810 located thereabout; and the outer jacket 810 has the metallic tube 820 located thereabout. The metallic tube 820 has the inner portion 830 at least partially embedded in the outer jacket 810.

Figure 10:
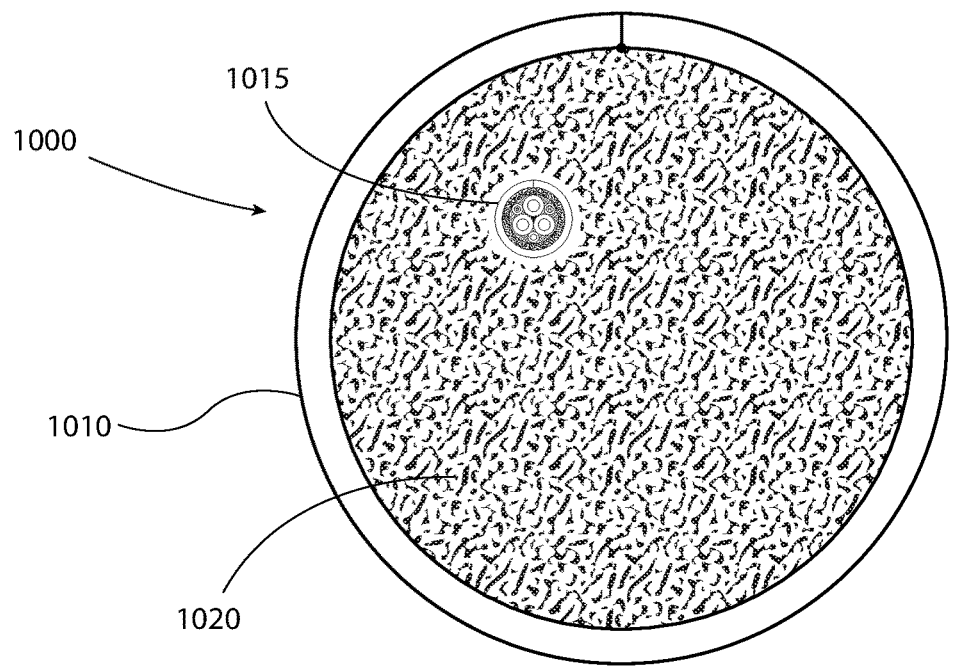
FIG. 10 depicts an assembly for deploying a metal-clad cable into a well.

FIG. 10 depicts an assembly for deploying a metal-clad cable into a well.

The assembly 1000 includes coiled tubing 1010. A metallic-clad cable 1015 is located within the coiled tubing 1010. The metallic-clad cable 1015 can be any cable disclosed herein. The space between the metallic-clad cable 1015 and the coiled tubing 1010 has a fluid 1020 located therein.

Figure 11:
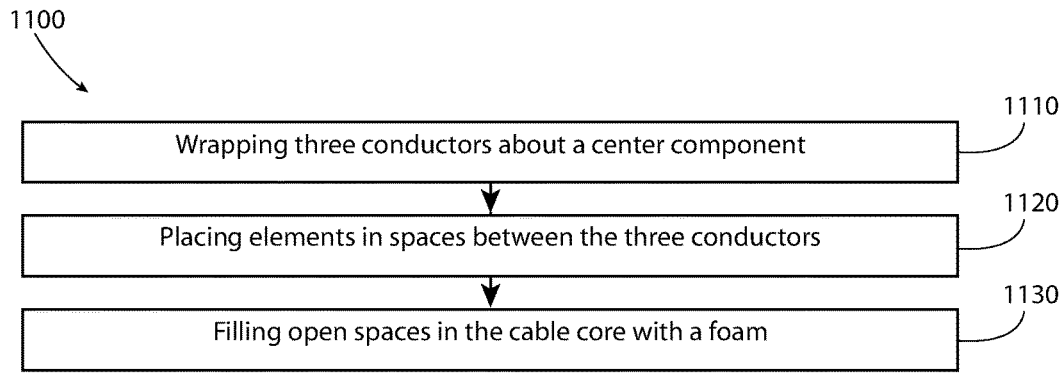
FIG. 11 depicts a method of making a cable core.

FIG. 11 depicts a method of making a cable core. The method 1100 is depicted as a plurality of blocks or operations. The method 1100 includes wrapping three conductors about a center component (Block 1110). The method 1100 also includes placing elements in spaces between the three conductors (Block 1120). The elements can be filler rods. The method 1100 further includes filling open spaces in the cable core with a foam (Block 1130).

Figure 12:
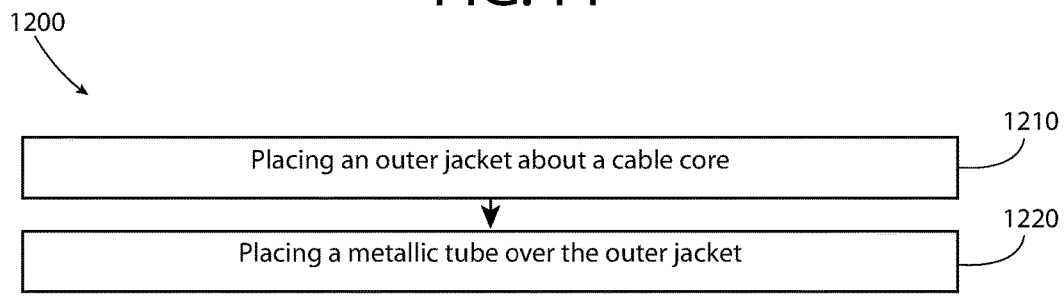
FIG. 12 depicts a method of making a metal-clad cable.

FIG. 12 depicts a method of making a metal-clad cable. The method 1200 is depicted as a plurality of blocks or operations. The method 1200 includes placing an outer jacket about a cable core (Block 1210). The outer jacket can be placed about the cable core by extruding a polymer or similar material about the foam of the cable core.

The method 1200 also includes placing a metallic tube over the outer jacket (Block 1220). The metallic tube can be placed over the outer jacket by drawing a seam welded metallic tube thereabout, and an inner weld bead of the metallic tube can at least partially embed into the outer jacket.

Figure 13:
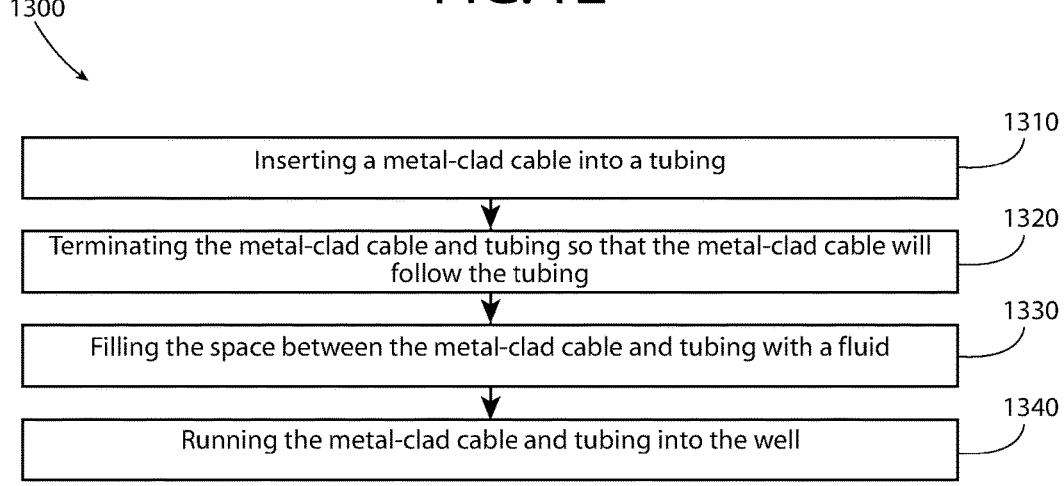
FIG. 13 depicts a method of deploying cable into a well.

FIG. 13 depicts a method of deploying cable into a well. The method 1300 is depicted as a plurality of blocks or operations. The method 1300 includes inserting a metal-clad cable into a tubing (Block 1310). The metal-clad cable can be inserted using now know or future known techniques.

The method 1300 can include terminating the metal-clad cable and tubing so that the metal-clad cable will follow the tubing (Block 1320). The method 1300 also includes filling the space between the metal-clad cable and tubing with a fluid (Block 1330), and running the metal-clad cable and tubing into the well (Block 1340).

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

What is claimed is:

1. A metal-clad cable, wherein the metal-clad cable comprises:
    a cable core comprising:
        a center component;
        a plurality of conductors wrapped about the center component and at least partially embedded therein;
        a plurality of elements located in spaces formed between the plurality of conductors; and
        a foam located about the center component, the plurality of conductors, and the plurality of elements;
    an outer jacket located about the cable core; and
    a metallic tube located about the outer jacket, wherein an interior portion of the metallic tube at least partially embeds into the outer jacket.

2. The metal-clad cable of claim 1, wherein the foam fills the cable core and traps air therein.

3. The metal-clad cable of claim 1, wherein the plurality of elements is empty tubes, tubes with insulated conductors located therein, tubes with optical fibers located therein, or combinations thereof.

4. The metal-clad cable of claim 1, wherein the foam is a foamed polymer.

* * * * *